(12) United States Patent
Lawless, III et al.

(10) Patent No.: US 10,974,430 B2
(45) Date of Patent: Apr. 13, 2021

(54) METHOD FOR CONTROLLING A RATE OR FORCE OF A CLAMP IN A MOLDING SYSTEM USING ONE OR MORE STRAIN GAUGES

(71) Applicant: IMFLUX INC., Hamilton, OH (US)

(72) Inventors: William Francis Lawless, III, Medford, MA (US); Rick Alan Pollard, Moscow, OH (US); Chow-Chi Huang, West Chester, OH (US); Gene Michael Altonen, West Chester, OH (US)

(73) Assignee: IMFLUX INC., Hamilton, OH (US)

( * ) Notice: Subject to any disclaimer, the term of this patent is extended or adjusted under 35 U.S.C. 154(b) by 217 days.

(21) Appl. No.: 15/968,877

(22) Filed: May 2, 2018

(65) Prior Publication Data

US 2018/0319064 A1 Nov. 8, 2018

Related U.S. Application Data

(60) Provisional application No. 62/500,237, filed on May 2, 2017.

(51) Int. Cl.
*B29C 45/76* (2006.01)
*G05B 19/042* (2006.01)
*B29K 101/12* (2006.01)

(52) U.S. Cl.
CPC ........ *B29C 45/7653* (2013.01); *B29C 45/766* (2013.01); *G05B 19/042* (2013.01);
(Continued)

(58) Field of Classification Search
CPC ...... B29C 45/7653; B29C 2945/76481; B29C 2945/76709; B29C 2945/76254; B29C 2945/76257
See application file for complete search history.

(56) References Cited

U.S. PATENT DOCUMENTS 4,429,579 A 2/1984 Wilhelm
5,144,843 A 9/1992 Tamura et al.
(Continued)

FOREIGN PATENT DOCUMENTS

CN 202928556 U * 5/2013
DE 69308539 T2 10/1997
(Continued)

OTHER PUBLICATIONS

Translation of Japanese Patent Application Publication No. 61-283518 (Year: 1986).*

(Continued)

*Primary Examiner* — Marc C Howell
*Assistant Examiner* — John J Derusso
(74) *Attorney, Agent, or Firm* — Marshall, Gerstein & Borun LLP

(57) ABSTRACT

A method of monitoring and controlling a molding clamping apparatus in an injection molding or other molding process is disclosed. The method includes creating a target strain profile, receiving a deviation limit, receiving a change in strain relating to a mold while it is closing from a first strain gauge, identifying a deviation from a target strain profile based on the output from the first strain gauge, determining that the deviation exceeds the deviation limit, and adjusting the rate or force of clamp movement. The target strain profile may have a first portion relating to a clamp closing process, a second portion relating to a filling process, and a third portion relating to a clamp opening process. The first portion relating to the clamp closing process may include an intermediate portion relating to a coining process having an intermediate clamp force setpoint.

7 Claims, 12 Drawing Sheets

(52) U.S. Cl.
CPC ............... *B29C 2945/76006* (2013.01); *B29C 2945/76016* (2013.01); *B29C 2945/76224* (2013.01); *B29C 2945/76254* (2013.01); *B29C 2945/76381* (2013.01); *B29C 2945/76384* (2013.01); *B29C 2945/76391* (2013.01); *B29C 2945/76481* (2013.01); *B29C 2945/76505* (2013.01); *B29C 2945/76508* (2013.01); *B29C 2945/76702* (2013.01); *B29C 2945/76709* (2013.01); *B29C 2945/76859* (2013.01); *B29C 2945/76862* (2013.01); *B29C 2945/76869* (2013.01); *B29C 2945/76933* (2013.01); *B29C 2945/76943* (2013.01); *B29K 2101/12* (2013.01); *G05B 2219/2624* (2013.01)

(56) References Cited

U.S. PATENT DOCUMENTS

| | | | |
|---|---|---|---|
| 5,147,659 A * | 9/1992 | Watanabe | B29C 45/1777 425/145 |
| 5,472,331 A | 12/1995 | Watkins | |
| 5,556,582 A | 9/1996 | Kazmer | |
| 5,846,573 A * | 12/1998 | Wurst | B29C 33/76 425/149 |
| 5,916,501 A | 6/1999 | Hehl | |
| 6,056,902 A | 5/2000 | Hettinga | |
| 6,090,318 A | 7/2000 | Bader et al. | |
| 6,514,440 B1 | 2/2003 | Kazmer et al. | |
| 6,840,115 B1 * | 1/2005 | Ishikawa | B29C 45/7653 425/135 |
| 7,676,300 B2 | 3/2010 | Kim et al. | |
| 8,092,206 B2 | 1/2012 | Brunbauer et al. | |
| 9,097,565 B2 | 8/2015 | Beaumont et al. | |
| 9,289,933 B2 | 3/2016 | Altonen et al. | |
| 9,671,889 B1 * | 6/2017 | Miller | G06K 9/0002 |
| 10,525,626 B2 * | 1/2020 | Lawless, III | B22D 17/32 |
| 2003/0071382 A1 | 4/2003 | Neal | |
| 2003/0089179 A1 * | 5/2003 | Noma | G01L 5/0076 73/856 |
| 2004/0247724 A1 | 12/2004 | Manner | |
| 2004/0265410 A1 * | 12/2004 | Hehl | B29C 45/7653 425/169 |
| 2006/0082010 A1 | 4/2006 | Saggese et al. | |
| 2009/0117220 A1 | 5/2009 | Bazzo et al. | |
| 2009/0243161 A1 | 10/2009 | Beale | |
| 2011/0142593 A1 | 6/2011 | Hoffmann et al. | |
| 2011/0175248 A1 | 7/2011 | Akasaka | |
| 2011/0254183 A1 | 10/2011 | Maris-Haug et al. | |
| 2012/0217668 A1 | 8/2012 | Catoen et al. | |
| 2012/0295049 A1 | 11/2012 | Altonen et al. | |
| 2013/0142899 A1 | 6/2013 | Murata | |
| 2014/0141117 A1 | 5/2014 | Altonen et al. | |
| 2015/0084221 A1 | 3/2015 | Oomori | |
| 2015/0115491 A1 | 4/2015 | Altonen et al. | |
| 2015/0202815 A1 | 7/2015 | Murata | |
| 2016/0236392 A1 | 8/2016 | Aoyama | |
| 2016/0263801 A1 | 9/2016 | Zigante et al. | |
| 2017/0021543 A1 | 1/2017 | Pollard et al. | |
| 2017/0021544 A1 | 1/2017 | Pollard et al. | |
| 2017/0252956 A1 | 9/2017 | Huang et al. | |
| 2017/0326770 A1 * | 11/2017 | Hirose | B29C 45/1777 |
| 2018/0001530 A1 | 1/2018 | Lawless, III et al. | |
| 2018/0001531 A1 | 1/2018 | Lawless, III et al. | |
| 2018/0003575 A1 | 1/2018 | Pollard et al. | |
| 2018/0072159 A1 * | 3/2018 | Wampler, II | H01M 10/48 |
| 2018/0141252 A1 | 5/2018 | Lawless, III et al. | |
| 2018/0281257 A1 | 10/2018 | Unkovic et al. | |
| 2019/0187014 A1 * | 6/2019 | Werner-Spatz | G01L 25/00 |
| 2019/0308353 A1 | 10/2019 | Lawless, III et al. | |
| 2019/0337207 A1 | 11/2019 | Huang et al. | |
| 2019/0346321 A1 * | 11/2019 | Nakayama | G01L 5/0009 |
| 2020/0032780 A1 * | 1/2020 | Yanagibayashi | F04B 53/16 |

FOREIGN PATENT DOCUMENTS

| | | | |
|---|---|---|---|
| DE | 19882043 T1 | 1/2000 | |
| DE | 102007061775 A1 | 7/2009 | |
| DE | 102008040955 A1 | 2/2010 | |
| DE | 102009014311 A1 | 2/2010 | |
| DE | 102009053493 A1 | 5/2010 | |
| DE | 112008002597 T5 | 7/2010 | |
| DE | 102011102313 A1 | 12/2011 | |
| DE | 102012018748 A1 | 4/2013 | |
| EP | 0644030 A2 | 3/1995 | |
| EP | 0649721 A1 | 4/1995 | |
| EP | 0671575 A2 | 9/1995 | |
| EP | 0897786 A2 | 2/1999 | |
| EP | 0987092 A1 | 3/2000 | |
| EP | 1013400 A2 | 6/2000 | |
| EP | 1205291 A1 | 5/2002 | |
| FR | 2621525 A1 | 4/1989 | |
| JP | 61283518 A * | 12/1986 | ......... B29C 45/7653 |
| JP | S6218234 A | 1/1987 | |
| JP | S6274617 A | 4/1987 | |
| JP | H044117 A | 1/1992 | |
| JP | H05329864 A | 12/1993 | |
| JP | H0890622 A | 4/1996 | |
| JP | H08112842 A | 5/1996 | |
| JP | H08244086 A | 9/1996 | |
| JP | 09187853 A * | 7/1997 | ......... B29C 45/7653 |
| JP | 10119100 A * | 5/1998 | ......... B29C 45/7653 |
| JP | 2001079886 A | 3/2001 | |
| JP | 2008265184 A * | 11/2008 | |
| WO | WO-97/13132 A1 | 4/1997 | |
| WO | WO-2015/060315 A1 | 4/2015 | |
| WO | WO-2015066004 A1 | 5/2015 | |

OTHER PUBLICATIONS

Translation of Japanese Patent Application Publication No. 8-244086 ("Kondo") (Year: 1996).*
Translation of Japanese Patent Application Publication No. 9-187853 (Year: 1997).*
Translation of Japanese Patent Application Publication No. 10-119100 ("Okada") (Year: 1998).*
Translation of Japanese Patent Application Publication No. 2008-265184 (Year: 2008).*
Translation of CN-202928556-U (Year: 2013).*
In-Situ Shrinkage Sensor for Injection Molding by Rahul R. Panchal and David O. Kazmer, Journal of Manufacturing Science and Engineering, Dec. 2010, vol. 132, 064503-1-064503-6.
Invitation to Pay Additional Fees and, Where Applicable, Protest Fee, International Application No. PCT/US2017/036327, dated Aug. 18, 2017.
U.S. Appl. No. 15/992,855, Injection Molding of Crosslinking Polymers Using Strain Data, filed May 30, 2018.
U.S. Appl. No. 62/481,291, Mold Non-Time Dependent Determination of Injection Molded Part Ejection Readiness, filed Apr. 4, 2017.
U.S. Appl. No. 62/303,654, External Sensor Kit for Injection Molding Apparatus and Methods of Use, filed Mar. 4, 2016.
U.S. Appl. No. 62/356,643, Method for Monitoring and Controlling an Injection Molding Process Using a Strain Gauge, filed Jun. 30, 2016.
U.S. Appl. No. 62/652,601, Method of Determining Melt Flow Front Travel Using Injection Melt Pressure and Screw Position to Generate an Output and Continuously Monitor Check Ring Repeatability, filed Apr. 4, 2018.
European Patent Application No. 18726004.7, Communication Pursuant to Article 94(3) EPC, dated Nov. 2, 2020.

* cited by examiner

METHOD FOR CONTROLLING A RATE OR FORCE OF A CLAMP IN A MOLDING SYSTEM USING ONE OR MORE STRAIN GAUGES

CROSS REFERENCE TO RELATED APPLICATIONS

This application is a non-provisional, and claims the benefit of the filing date of, U.S. Provisional Patent Application No. 62/500,237, filed May 2, 2017, entitled "Method for Controlling a Rate or Force of a Clamp in a Molding System Using One or More Strain Gauges." The entire contents of U.S. Provisional Application No. 62/500,237 is hereby incorporated by reference.

FIELD OF THE DISCLOSURE

This application relates generally to injection molding and, more specifically, to a method of controlling the clamping rate and force of an electric or hydraulic clamping system in an injection molding process using strain gauge values. In particular, this application relates to identifying changes in strain in a mold during an injection molding process using at least one strain gauge and increasing or decreasing the rate or force of an electric or hydraulic clamping unit based on the sensed change in strain.

BACKGROUND

At the start of an injection molding process, thermoplastic pellets are fed by a hopper into a heated barrel and driven to the end of the heated barrel by a reciprocating screw. The thermoplastic pellets melt into a molten thermoplastic material, and shots of thermoplastic material are injected through a nozzle. The molten thermoplastic material then flows through either a cold runner or a hot runner to the valve gates of each individual cavity of a mold. Each individual cavity may have one or more than one valve gate. After entering the valve gate or valve gates, the molten thermoplastic material fills a mold cavity formed between two or more sides of the mold held together under pressure by a press or clamping unit. Once the shot of molten thermoplastic material is injected into the mold cavity, the reciprocating screw stops traveling forward. The molten thermoplastic material takes the form of the mold cavity and cools inside the mold until it solidifies. Then the clamping unit releases the mold sides and the finished part is ejected from the mold.

The injection molding process may vary depending on the type of injection molding being performed. For example, traditional injection molding machines inject the molten thermoplastic material at very high pressures, typically greater than 15,000 psi, for a first period of time, and thereafter hold the pressure for a second period of time at a lower but still relatively high pressure of 10,000 psi or more. More recently, constant low pressure multi-cavity injection molding systems have been developed that inject the molten plastic material into the mold cavity at a substantially constant low pressure, typically less than 6,000 psi, for a single time period. Other injection molding processes include metal injection molding (MIM), reaction injection molding (RIM), and liquid injection molding (LIM).

Whatever the type of injection molding process being carried out, monitoring of the process over time is desirable in order to identify and correct any problems as soon as possible. For example, the pressure within a mold cavity is an important parameter to monitor, as insufficient pressure may result in improperly formed parts while excessive pressure may result in damage to the mold. One particular motivation to monitor flow front position and/or control internal pressure at certain times during the short duration of filling of a mold cavity is to account for flow filling challenges.

The term "flow filling challenge" is defined as a region of a part of a mold that forms a feature of a part to be molded which is particularly susceptible to any one or more of a number of problems that complicate the molding of the part or render the molded part more likely to suffer from one or more defects or reduced mechanical properties, such as short-fills, warp, sinks, brittleness, flash, voids, non-fills, weakness (e.g., low tensile, torsional, and/or hoop strength), high stress concentrations, low modulus, reduced resistance to chemical exposure, premature fatigue, non-uniform shrinkage, and discontinuities in color, surface texture, opacity, translucency, or transparency. Non-exhaustive examples of flow filling challenges are: locations in a mold used to form ribs, bosses, or corners, as well as obstacles in a mold (such as core pins), and transitions (such as a change in thickness of a part to be molded, which may be a sudden stepped change in thickness or a gradual change in thickness, such as a tapered region). These can involve a transition from a relatively thick region to a relatively thin region, and then back to a relatively thick region, and may involve one or more changes in thickness. The portion of a mold cavity used to form a living hinge, which is typically an integral, relatively thin region of a molded part that permits one portion of the part, such as a flip-top of a cap, to rotate with respect to the rest of the part, also poses a flow filling challenge. As the term flow filling challenge is used herein, it is contemplated that the region of the part affected by a particular challenge may be at a particular position of a mold cavity, along a region of a mold cavity, or downstream of a particular position or region of a mold cavity, and as such, a flow filling challenge need not be limited to a particular location of a change in shape of a mold cavity, but may extend beyond, i.e. downstream of, such a location.

To address flow filling challenges, a clamping profile may be implemented during a process to allow for proper evacuation of gases prior to the filling portion of a process. Prior to the application of the final clamping force, an intermediate step in the clamping profile may also be added to allow for a vacuum to be applied to the mold cavity to evacuate atmospheric gas that is present. This is commonly referred to as coining. Coining is typically used for parts that require vents that are less than 0.001" due to the viscosity of the material, parts in which weld line strength is critical, or in parts that are made with a material that typically yields more gas, such as a plastic foam. The advantages of coining include, but are not limited to, reduced flash due to smaller vents, lower clamping tonnage requirements, and reduction or elimination of weld lines. This increases part quality as well as reduces mold wear.

A clamping profile may also be implemented during the filling process to allow for proper evacuation of gases. The clamp force applied during the filling process may follow a preset profile. For example, the clamp force may increase during the filling process. A maximum clamping force may be achieved near the end of the filling process when it is typically needed the most.

In a mold clamping profile, the clamping force applied typically varies based on: (1) time, (2) clamp position, and/or 3) the amount of the fill that has taken place, which can be estimated based on the screw position. Additionally, the clamping force applied in a mold clamping profile may depend upon an approximation of the melt pressure for a particular region of a single part or a particular part in a group of dissimilar parts. Mechanically, the method for increasing or decreasing the clamping force typically involves either: (1) controlling a hydraulic valve to increase or decrease the amount of hydraulic oil applied to the hydraulic ram, hydraulic piston or die height bearings for a toggle, thereby increasing or decreasing the clamping force or (2) controlling a servo motor to move a ball screw or gear to apply more or less clamping force. The clamp control system usually only recognizes two states: a state in which clamping force is increasing to or decreasing from a setpoint, and a constant clamping force at the setpoint until the end of cooling time. However, some control systems, such as systems performing coining, recognize a single intermediate position between an increasing clamping force state and a constant clamping force state.

Ideally, sensors for monitoring clamping force would be indirect, easy to install, and inexpensive. Direct sensors, such as sensors placed within a mold cavity, leave undesirable marks on part surfaces. For example, while demand for injection molded parts with high gloss finishes has been increasing, direct sensors positioned in the mold cavity have a tendency to mar the high gloss finish of the parts, requiring post-molding operations to machine or otherwise mask or remove the marred regions from the parts. As a result, indirect sensors that are not located in the mold cavity are preferable. Additionally, when the molding system is being used to make products for medical applications, contact between a sensor and the thermoplastic material may be prohibited.

Recently, strain gauges have been placed on a mold surface, within a nozzle adapter, or elsewhere within an injection molding apparatus, in order to measure how strain at the measured location changes over the course of a standard injection molding process. However, two key challenges make it difficult to approximate a condition within a mold cavity using an external sensor, such as a strain gauge, placed on a mold surface. First, not all areas of a mold surface experience a measurable condition, such as strain, in a way that accurately, reliably, and/or quantifiably corresponds with a condition within the mold, such as the pressure within the mold cavity or the location of the melt flow front, and therefore only some areas of a mold surface can be used to approximate one or more conditions within the mold, such as the pressure within the mold cavity or the location of the melt flow front. Injection molds come in a variety of shapes and sizes. Identifying areas of a mold surface that can be used to approximate a condition within the mold using an external strain gauge sensor has required testing a number of different areas on the mold surface, which can be time consuming, or making a blind guess that may turn out to be wrong. Second, even in areas on the surface mold that do experience a condition, such as strain, in a way that corresponds with a condition within the mold, external sensors often pick up some amount of "noise" generated during the molding process that does not correspond with a condition within the mold cavity. The noise measurements picked up by the external sensor must be distinguished from the meaningful measurements in order to accurately approximate one or more conditions within the mold. In some cases, the ratio of noise measurements to meaningful measurements is so high that conditions within the mold cannot be accurately approximated. A strain gauge sensor placed on the exterior of the mold surface adjacent to a parting line of a mold has been described in co-owned U.S. Patent Application No. 62/303,654, "External Sensor Kit for Injection Molding Apparatus and Methods of Use," the entirety of which is hereby incorporated by reference, and is able to sense the surface strain changes on the mold surface that occur over time as a result of the closing and opening forces. In response to surface strain changes, the strain gauge sensor emits an electrical signal, typically in the range of −10 to 10 Volts. The signal emitted by the strain gauge sensor is received and used by a controller to approximate one or more conditions within the mold, such as the pressure within the mold cavity or the location of the melt flow front. In certain molds in which the ratio of the length of the flow channel to the thickness of the molded part is great, i.e. molds having a high length-to-thickness (L/t) ratio, the pressure at the melt flow front may be approximated based on the signals emitted by the strain gauge sensor(s). Strain gauges placed on the outside of a mold or molding surface enable flexibility and portability for use on multiple places on the same mold or they may be removed from the mold during a mold change and installed on another mold in the same molding machine, or transported and installed on a mold on a separate molding machine.

Control of an injection molding system generally using strain gauge measurements is disclosed in U.S. Patent Application No. 62/356,643, "Method for Monitoring and Controlling an Injection Molding Process Using a Strain Gauge", the entirety of which is hereby incorporated by reference. As described therein, throughout an injection molding process, the mold experiences changes in strain. The strain experienced by a mold may differ depending on what type of injection molding process is being used. A strain profile can be developed that identifies target strain changes that should be occurring at each step in an injection molding process. Once a strain profile has been developed for a molding system, deviations from the target strain profile can be identified and used to take corrective action. Process variables, such as measured strain, can be compared to reference values used to make the strain profile. An upper and lower acceptable deviation limit may be set for each reference value and may be adjusted if desirable. The ability to set or adjust a reference value or the upper and lower acceptable deviation limit may be limited to system administrators. Because temperature impacts material expansion and thus strain, temperature data provided from a location near the strain sensor should always be taken into consideration when calculating deviations from a target strain profile.

SUMMARY

Embodiments within the scope of the present disclosure are directed to using parameters provided by an external sensor to generally control a rate and a force of clamp movement. A variable force clamping profile may be used in an injection molding process, which is the primary process discussed herein. However, a variable force clamping profile may alternately be used in other molding processes, such as a substantially constant pressure injection molding process, an injection-blow molding process, a metal injection molding (MIM) process, a reaction injection molding (RIM) process, a liquid injection molding (LIM) process, a structural foam molding process, a liquid crystal polymer (LCP) molding process and an injection-stretch blow molding process. Strain gauge sensors are the type of sensor primarily discussed, while other sensors capable of detecting movement of steel as a proxy or tell-tale for internal conditions such as melt pressure, could achieve the same purpose as a strain gauge sensor and are within the scope of the present disclosure. For example, microwave sensor kits, x-ray sensor kits, ultrasonic sensor kits, air pressure sensor kits, air temperature sensor kits, and sub-surface temperature sensor kits, could all be substituted for the strain gauge sensors described and depicted below. Additionally, other types of external gauge sensors, such as electrical, electronic, mechanical, wireless, and fiber optic sensors, could be utilized instead of strain gauge sensors.

Strain gauge sensors used to control the rate or force of clamp movement could be placed on an outside surface of a mold or a mold plate. One or more strain gauge sensors may be used on a mold. The strain gauge sensors may be easily removable and portable for use in different locations on the same mold or may be removed from the mold altogether during a mold change to install on a different mold used with the same molding system or a different molding system. The portability of the strain gauges allows for gauges to be dedicated to a molding system rather than a specific mold, thus reducing costs by limiting the number of strain gauges required throughout a given factory. Alternately, strain gauge pins could be installed on a cavity block outside the molding surface. Strain gauge sensors located on mold surfaces and within cavity blocks outside a mold cavity are primarily discussed below, while strain gauge sensors located in other locations within an injection molding apparatus could achieve the same purposes. In addition, strain gauge sensors within the scope of the present disclosure are designed to amplify meaningful measurements so that noise measurements do not prevent the approximation of conditions within a mold. Strain voltage measurements and other proxies for internal pressure or flow front position are often amplified prior to analytical evaluations, such as generating plots of pressure vs. time curve for a particular injection molding cycle. In most instances, strain measurements would still be amplified when taken with a strain gauge sensors of the present disclosure, albeit the amount of amplification can be reduced, since the strain gauge sensors disclosed herein serve to diminish the effects of noise. As such, by isolating and optimizing the efficacy of the strain gauge employing the apparatus and methods of the present disclosure, the strain gauge sensors essentially serve to pre-amplify the strain gauge measurements. For example, strain gauge sensors may serve as a physical pre-amplifier for the meaningful strain measured in at least three ways. First, the strain gauge sensor may be placed on a first portion of a strain gauge assembly, and the first portion of a strain gauge assembly may be made from a material having a flexural modulus that maximizes strain in the first portion of a strain gauge assembly. For example, brass and aluminum experience a greater strain than steel. Second, the first portion of a strain gauge assembly may have a geometry that maximizes strain at the location being sensed by the strain gauge sensor. Third, the strain gauge assembly may include a second portion of the stain gauge assembly that exerts a force on the first portion of a strain gauge assembly when the injection mold is closed, and the force exerted by the second portion of the strain gauge assembly on the first portion of a strain gauge assembly (and thus the resulting strain in the first portion of a strain gauge assembly) may be maximized using the law of the second portion of the strain gauge assembly. That is, the portion of the second portion of the strain gauge assembly that contacts or affects the first portion of a strain gauge assembly may be located some distance away from a fixed point, thus creating a lever arm that amplifies the strain within the first portion of a strain gauge assembly. Strain gauge measurements provided to a controller of an injection molding system can be used to optimize the clamping force better than is possible using time or positions for control because strain gauge measurements provide a more accurate estimation of melt pressure within an injection molding system. Measurements provided by strain gauge sensors may be used by a controller to provide a more consistent delivery of force throughout the cooling portion of a cycle when clamping force is no longer required, thereby reducing energy consumption and wear on the injection mold and its components.

A method of monitoring and controlling a variable force clamping process may include creating, by one or more processors, a target strain profile for a clamping and unclamping process of a molding apparatus. The method may include receiving, via an interface, an upper deviation limit and a lower deviation limit for the target strain profile, and receiving, as an output from a first strain gauge, a change in strain in a mold. The method may include identifying, by the one or more processors, a deviation from the target strain profile based on the sensed change in strain provided as the output from the first strain gauge. The method may include comparing, by the one or more processors, the deviation to the upper deviation limit or the lower deviation limit. The method may include determining, by the one or more processors, that the deviation exceeds the upper deviation limit or the lower deviation limit and adjusting a rate or a force of clamp movement. Additionally, the method may include receiving, as an output from a supplemental strain gauge, a supplemental change in strain, and identifying, by the one or more processors, the deviation from the target strain profile based on the sensed change in strain provided as the output from the first strain gauge and the supplemental sensed change in strain provided as the output from the supplemental strain gauge.

The way by which the rate or force of clamp movement is adjusted depends on the type of clamping system in use. For a hydraulic clamping system, adjusting the rate or the force of clamp movement may include adjusting a flow of oil to at least one hydraulic valve. For an electric clamping system, adjusting the rate or the force of clamp movement may include adjusting an electric current or voltage to an electric motor.

The target strain profile may have a first portion relating to a clamp closing process, a second portion relating to a filling process, and a third portion relating to a clamp opening process. For example, when a plastic part in a mold starts to cool, the plastic part may start to shrink away from the mold sides. As a result, a reduction in strain may occur in the mold. This reduction in strain may be accounted for in the third portion of the target strain profile because it correlates with the beginning of a clamp opening process, as the clamp no longer needs to maintain a clamping force or hold the mold closed once the cooling part of the molding process is complete. The first portion of the target strain profile relating to the clamp closing process may include an intermediate portion relating to a coining process having an intermediate clamp force setpoint.

The method of monitoring and controlling a clamping force profile may be provided in a non-transitory computer-readable medium storing processor-executable instructions. Additionally, the method may be provided on a client device comprising one or more processors, one or more interfaces, and non-transitory computer-readable medium storing processor-executable instructions. Additional methods of using non-time dependent parameters and/or variables to open an injection mold and eject a molded part are disclosed in co-owned U.S. Patent Application No. 62/481,291, "In-Mold Non-Time Dependent Determination of Injection Molded Part Ejection Readiness," the entirety of which is hereby incorporated by reference.

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
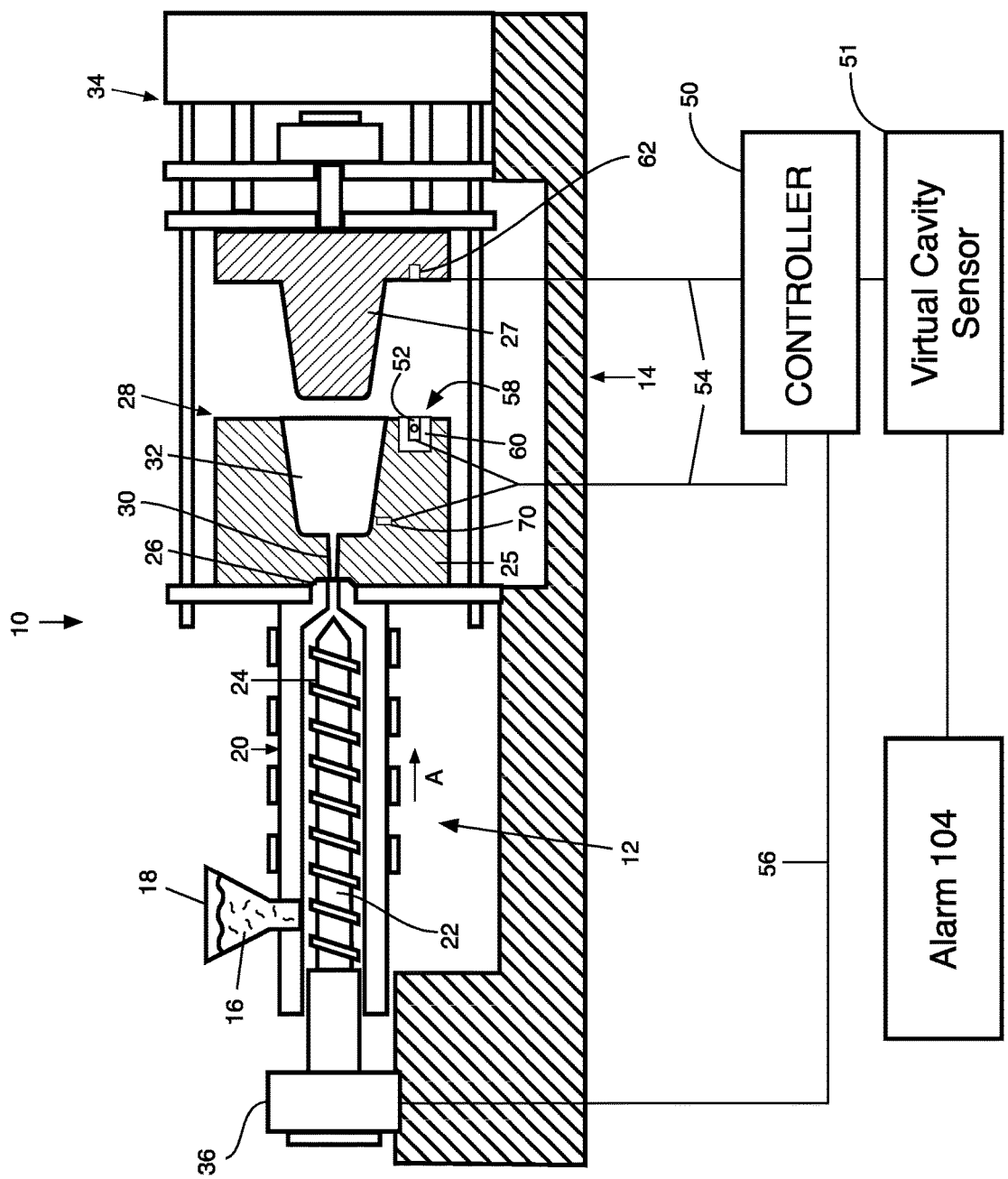
FIG. 1 illustrates, semi-schematically, a conventional injection molding apparatus, wherein a first portion of strain gauge sensor assembly containing a strain gauge is placed adjacent to a first mold side in the vicinity of the nozzle to the mold cavity and a second portion of the strain gauge sensor assembly is placed on a second mold side downstream of the nozzle and is configured to contact the first portion of the strain gauge sensor assembly when the mold is in a closed position.

Referring to the figures in detail, FIG. 1 illustrates an exemplary injection molding apparatus 10 for producing thermoplastic parts in high volumes (e.g., a class 101 injection mold, or an "ultra-high productivity mold", a class 102 (medium-to-high productivity mold), or class 103 (a medium productivity mold)). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a ram, such as a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24 toward a nozzle 26 to form a shot of thermoplastic material, which will be injected into a mold cavity 32 of a mold 28 via one or more gates. The molten thermoplastic material 24 may be injected through a gate 30, which directs the flow of the molten thermoplastic material 24 to the mold cavity 32. In some instances, more than one gate 30 may be provided per mold cavity 32. The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 34 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a strain gauge sensor 52, a screw control 36, and a temperature sensor 70. The strain gauge 52 may be located on a first portion of a strain gauge assembly 58, which is secured to the exterior surface of a first mold side 25 near the parting line between the first mold side 25 and the second mold side 27 and in the vicinity of the nozzle 26 by a bracket 60. In other embodiments within the scope of the present disclosure, the strain gauge 52 may be located directly on the mold 28 or in another location in the injection molding apparatus 10 altogether. The temperature sensor 70 is located near the strain gauge 52. The controller 50 may include a microprocessor (or another suitable processing unit, or several such units), a non-transitory memory, and one or more communication links. In some embodiments, a second portion of the strain gauge sensor assembly 62 is secured to the exterior surface of the second mold side 27 near the parting line between the first mold side 25 and the second mold side 27 and is configured to contact the first portion of the strain gauge assembly 58 when the mold 28 is closed. In other embodiments, a pushing portion of the second portion of the strain gauge sensor assembly 62 may be secured to the exterior surface of the second mold side 27 while a lever portion of the second portion of the strain gauge sensor assembly 62 may be secured elsewhere within the injection molding apparatus 10 or may be integral with the first portion of the strain gauge assembly 58, with the second portion of the strain gauge sensor assembly 62 configured such that the pushing portion pushes the lever portion when the mold 28 is closed.

Figure 1A:
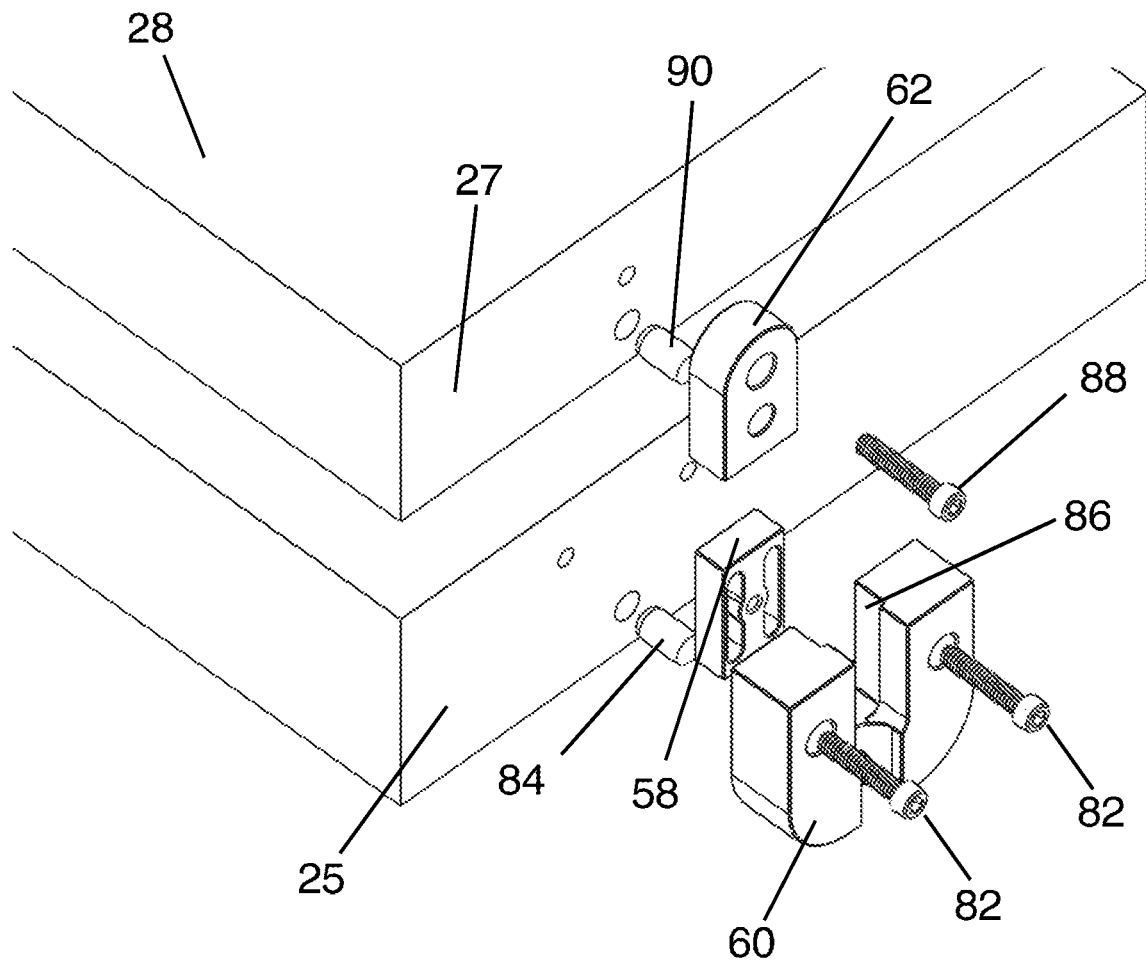
FIG. 1A illustrates an enlarged perspective view of the first and second portions of the strain gauge sensor assembly depicted in FIG. 1.

In some embodiments, as shown in FIG. 1A, the first mold side 25 has holes drilled therein. Bracket 60 is secured to the first mold side 25 by bolts 82 that are inserted through bracket 60 and into the first mold side 25 and by a peg 84 which is inserted partially into the bracket 60 and partially into a hole in the first mold side 25. The bracket 60 has a bracket ledge 86 configured to secure the first portion of the strain gauge assembly 58 in a floating manner between the bracket 60 and an exterior side of the first mold side 25. The first portion of the strain gauge assembly 58 is not attached to the bracket 60 or the first mold side 25 because doing so might create strain with the first portion of the strain gauge assembly 58 that would interfere with the calculation of conditions within the mold cavity. One side of the first portion of the strain gauge assembly 58 is aligned with the parting line of the mold 28 along an edge of first mold side 25. The second mold side 27 has holes drilled into it, and second portion of the strain gauge sensor assembly 62 is secured to the second mold side 27 by a bolt 88 that is inserted through the second portion of the strain gauge sensor assembly 62 into the second mold side 27 and by a peg 90 which is inserted partially into the second portion of the strain gauge sensor assembly 62 and partially into a hole in the second mold side 27. A side of the second portion of the strain gauge sensor assembly 62 is aligned with the parting line of the mold 28 along an edge of second mold side 27 and is configured to contact the first portion of the strain gauge sensor assembly 58 when the mold 28 is closed.

Figure 10A:
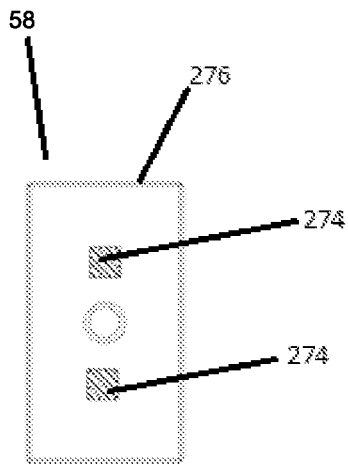
FIG. 10A illustrates a first portion of a strain gauge assembly of the present disclosure.

FIGS. 10A-10D depict various embodiments of the first portion of the strain gauge assembly 58 within the scope of the present disclosure. The striped portions 274 of the first portion of the strain gauge assemblies 58 indicate the locations where the ends of a strain gauge sensor would be placed. The first portion of the strain gauge assembly 58 in FIG. 10A is rectangular, and exposed side 276 is acted upon by the second portion of the strain gauge assembly 62 or opposing mold side in order to create strain within the first portion of the strain gauge assembly 58, which is measured by a strain gauge and used to calculate conditions within a mold cavity.

Figure 10B:
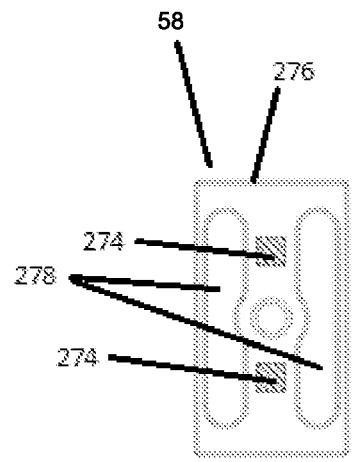
FIG. 10B illustrates a first portion of a strain gauge assembly of the present disclosure having an arrangement of selected material compositions and a geometry that amplify the strain experienced by the coupon.
Figure 10C:
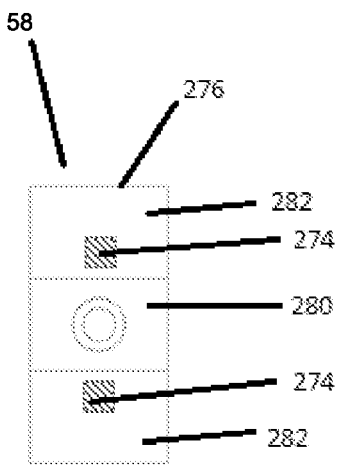
FIG. 10C illustrates a first portion of a strain gauge assembly of the present disclosure having an arrangement of selected material compositions and a first alternate geometry that amplify the strain experienced by the coupon.
Figure 10D:
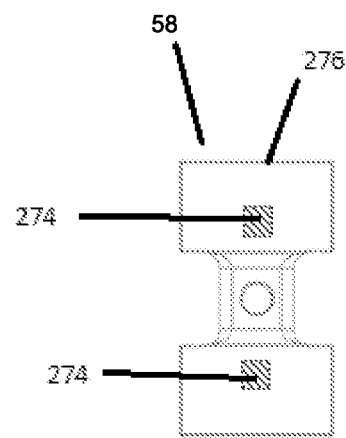
FIG. 10D illustrates a first portion of a strain gauge assembly of the present disclosure having an arrangement of selected material compositions and a second alternate geometry that amplify the 15 strain experienced by the coupon.

Each first portion of the strain gauge assembly 58 in FIGS. 10B-10D is configured to amplify the strain it experiences when a mold is closed relative to the strain that would be experienced if the first portion of the strain gauge assembly 58 had the configuration depicted in FIG. 10A. For example, FIGS. 10B and 10D depict first portion of the strain gauge assemblies 58 with geometries in which the cross-sectional area of the first portion of the strain gauge assembly 58 in a direction perpendicular to the direction the second portion of the strain gauge assembly 62 acts upon exposed side 276 decreases toward the center of the first portion of the strain gauge assembly 58. As a result, the center of the first portion of the strain gauge assembly 58 experiences greater strain, which can more easily be measured by a strain gauge. In FIG. 10B, this reduction in cross-sectional area is accomplished by openings 278 in the center of the first portion of the strain gauge assembly 58, which otherwise has a rectangular shape. In FIG. 10D, the reduction in cross-sectional area is accomplished by having a first portion of the strain gauge assembly 58 with an anvil-like shape. In FIG. 10C, the amplification of strain is achieved by making the first portion of the strain gauge assembly 58 from two different materials. Specifically, a center portion 280 is made from a material having a low flexural modulus while outer portions 282 are made from a material having a higher flexural modulus.

Data from the strain gauge sensor 52 and the temperature sensor 70 may be communicated to a processor that calculates a change in strain. Electric signals from the strain gauge sensor 52 and temperature sensor 70 may travel along one or more electrical paths, such as wires 54, depicted in FIG. 1 in solid lines, ranging in strength from −10 to 10 Volts. The controller 50 may be connected to the screw control 36 via wired connection 56. In other embodiments, the controller 50 may be connected to the screw control 36 via a wireless connection, a mechanical connection, a hydraulic connection, a pneumatic connection, or any other type of communication connection known to those having ordinary skill in the art that will allow the controller 50 to communicate with the screw control 36.

Additionally, the controller 50 is in communication with a virtual cavity sensor 51, which is implemented as a program, or a set of software instructions. More generally, however, virtual cavity sensor 51 can be implemented in hardware (e.g., as an application-specific integrated circuit (ASIC)), firmware, software, or any suitable combination thereof. In this disclosure, the term "virtual cavity sensor" can refer to a module that determines the value of a process variable, such as pressure or a rate or force exerted by clamping unit 34, without directly measuring this process variable. The virtual cavity sensor 51 strives to achieve a target strain profile in the injection molding apparatus 10 over time. The target strain profile may relate, for example, to a rate or a force of movement of the clamping unit 34. In some instances, the virtual cavity sensor 51 in conjunction with the controller 50 is able to achieve the target strain profile on its own. In some instances, problems may arise that cannot be corrected by the virtual cavity sensor 51 in conjunction with the controller 50. In such an instance, the virtual cavity sensor 51 activates an alarm 104. The alarm 104 may be a visual alarm, such as a flashing light or a pop-up window on a computer screen, or may be an audible alert such as a beeping sound or siren, or may be both visual and audible.

Figure 2:
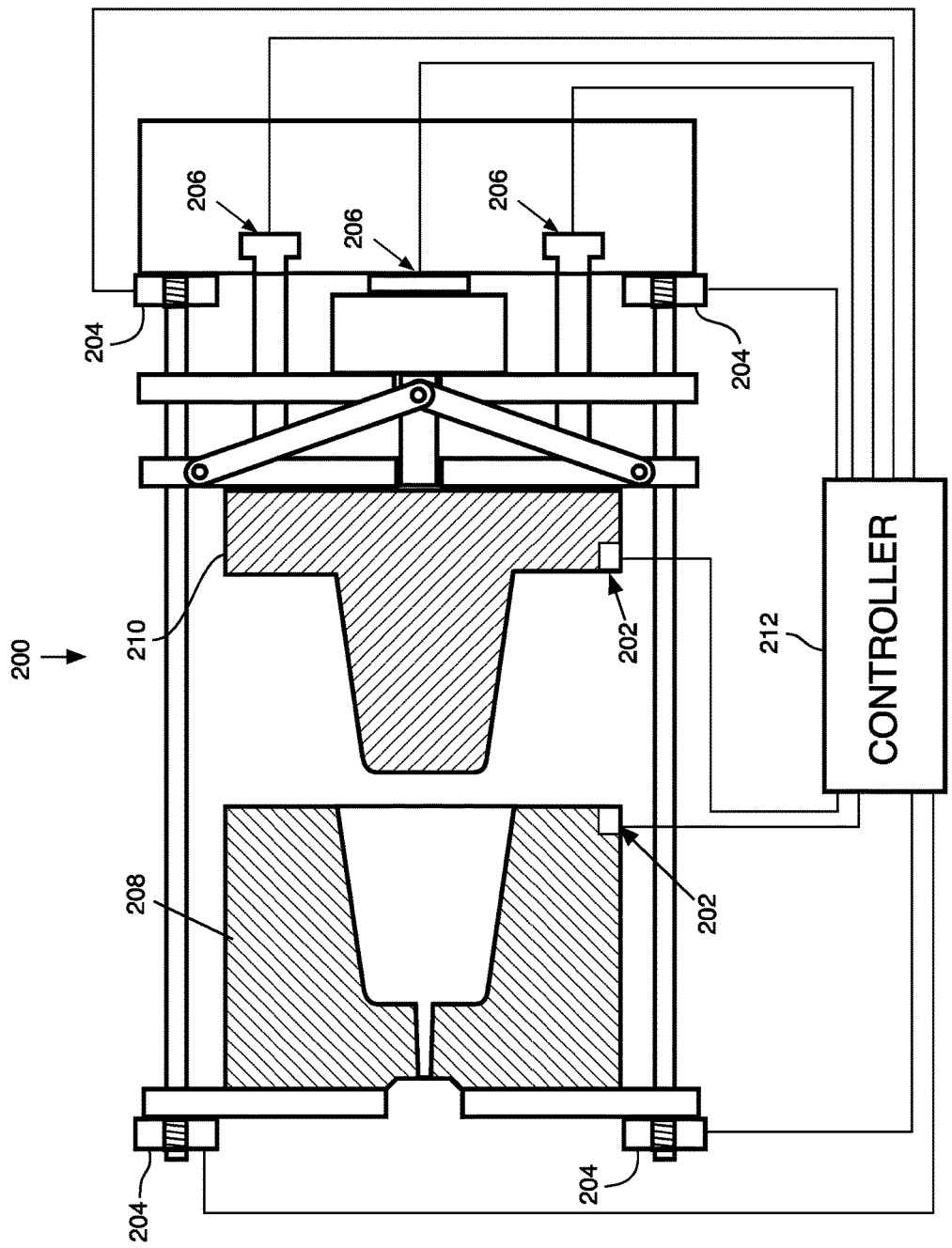
FIG. 2 illustrates schematically clamp force control of a hydraulic clamping mechanism.

FIG. 2 illustrates a side view of a hydraulic clamping system apparatus 200, which could be used in a system similar to that depicted in FIGS. 1 and 1A. Alternatively, the mold 208, 210 could be used in other molding processes, such as a substantially constant pressure injection molding process, an injection-blow molding process, a metal injection molding (MIM) process, a reaction injection molding (RIM) process, a liquid injection molding (LIM) process, a structural foam molding process, a liquid crystal polymer (LCP) molding process and an injection-stretch blow molding process. One or more sensors 202 are located on the mold 208, 210 to measure the amount of strain exhibited by the mold during the molding process. The sensors 202 may be strain gauges or strain pins. One of the sensors 202 may be considered a first or primary strain gauge, while the other may be considered a supplemental strain gauge. A controller 212, optionally in conjunction with a virtual cavity sensor (not depicted), compares the strain value to a target strain profile and increases or decreases the flow of hydraulic oil to piston valves 206 and/or lock nut valves 204 to increase or decrease the amount of clamping force or the rate of clamping accordingly.

Figure 3:
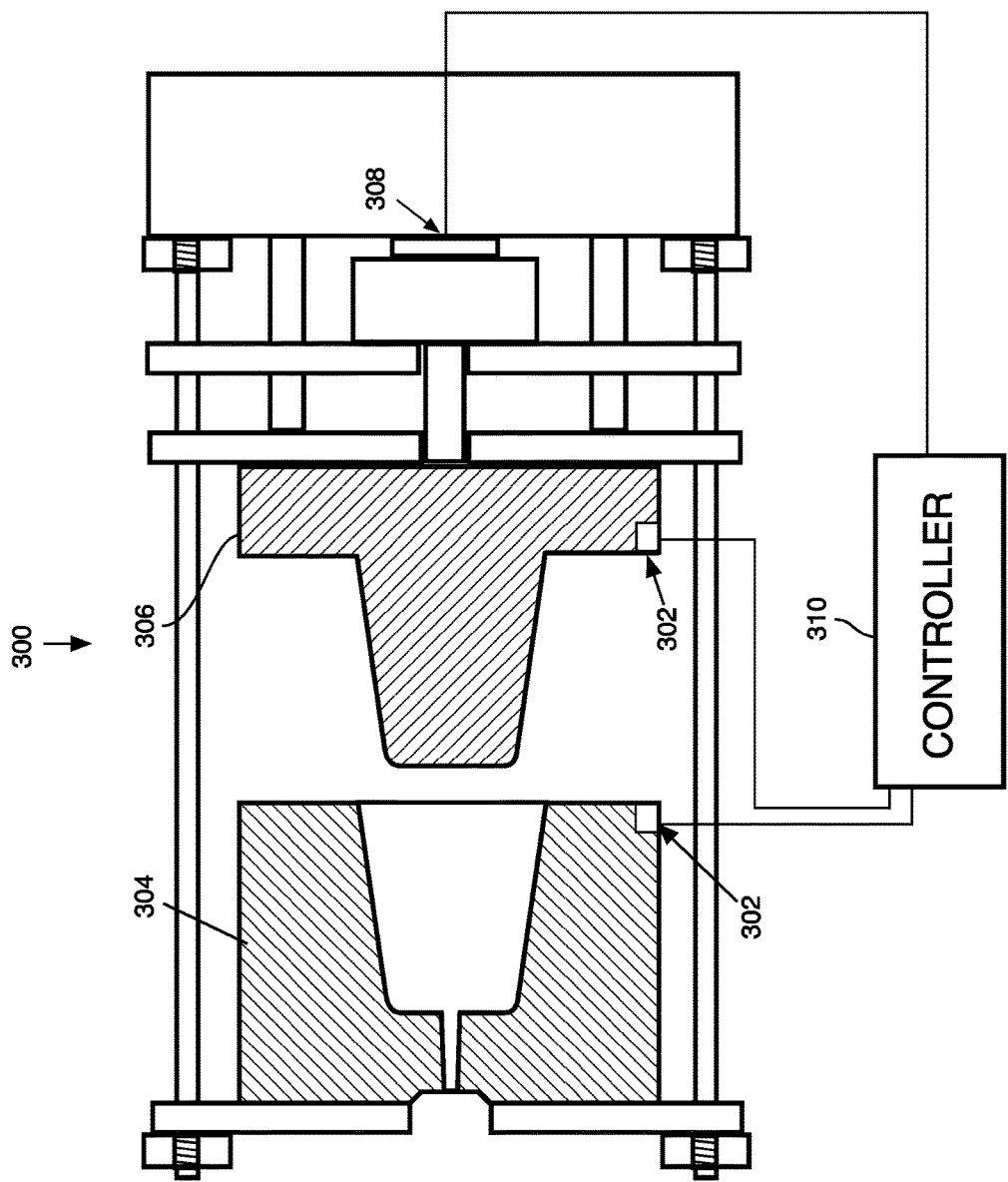
FIG. 3 illustrates schematically clamp force control of an electric clamping mechanism.

FIG. 3 illustrates a side view of an electric clamping system apparatus 300, which could be used in a system similar to that depicted in FIGS. 1 and 1A. Alternatively, the mold 304, 306 could be used in other molding processes, such as a substantially constant pressure injection molding process, an injection-blow molding process, a metal injection molding (MIM) process, a reaction injection molding (RIM) process, a liquid injection molding (LIM) process, a structural foam molding process, a liquid crystal polymer (LCP) molding process and an injection-stretch blow molding process. One or more sensors 302 are located on the mold 304, 306 to measure the amount of strain exhibited by the mold during the molding process. The sensors 302 may be strain gauges or strain pins. One of the sensors 302 may be considered a first or primary strain gauge, while the other may be considered a supplemental strain gauge. A controller 310, optionally in conjunction with a virtual cavity sensor (not depicted), compares the strain value to a target strain profile and increases or decreases the electric current and/or voltage to electric motor 308 to increase or decrease the amount of clamping force or rate of clamping accordingly.

Figure 4:
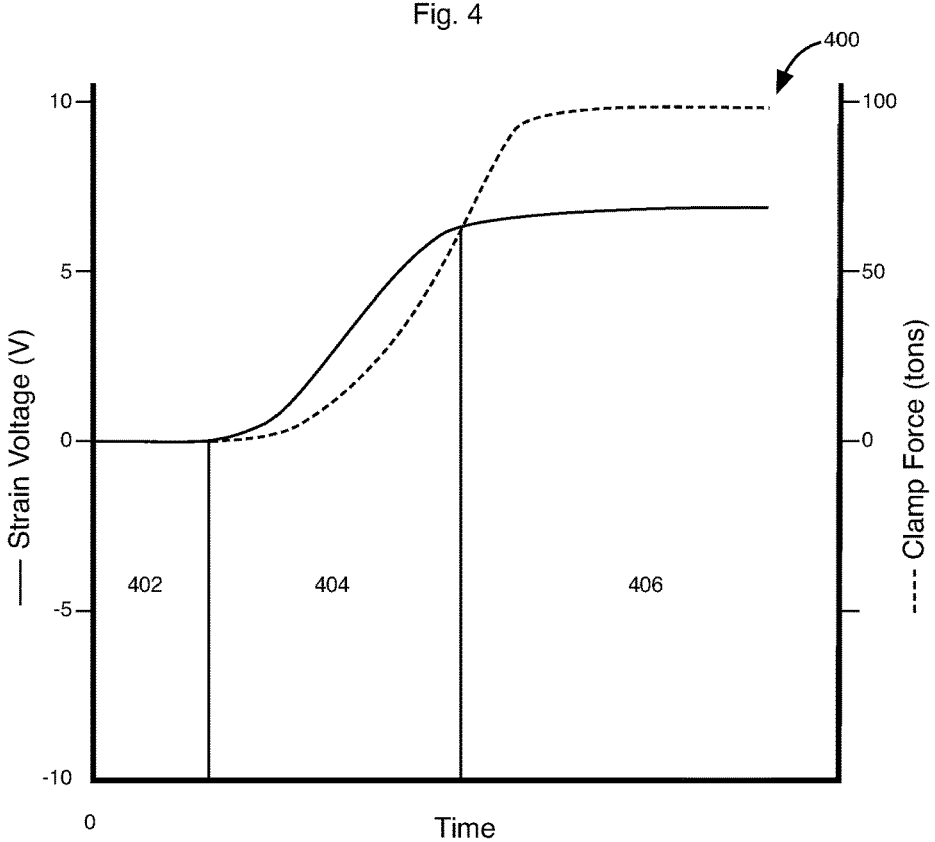
FIG. 4 is an exemplary target strain profile during clamp closing.

FIG. 4 is an exemplary target strain profile 400 during clamp closing. During initial mold closing 402 there is no mold contact and no strain change. Once mold contact occurs 404, there is an increase in strain until clamp force setpoint is reached 406.

Figure 4A:
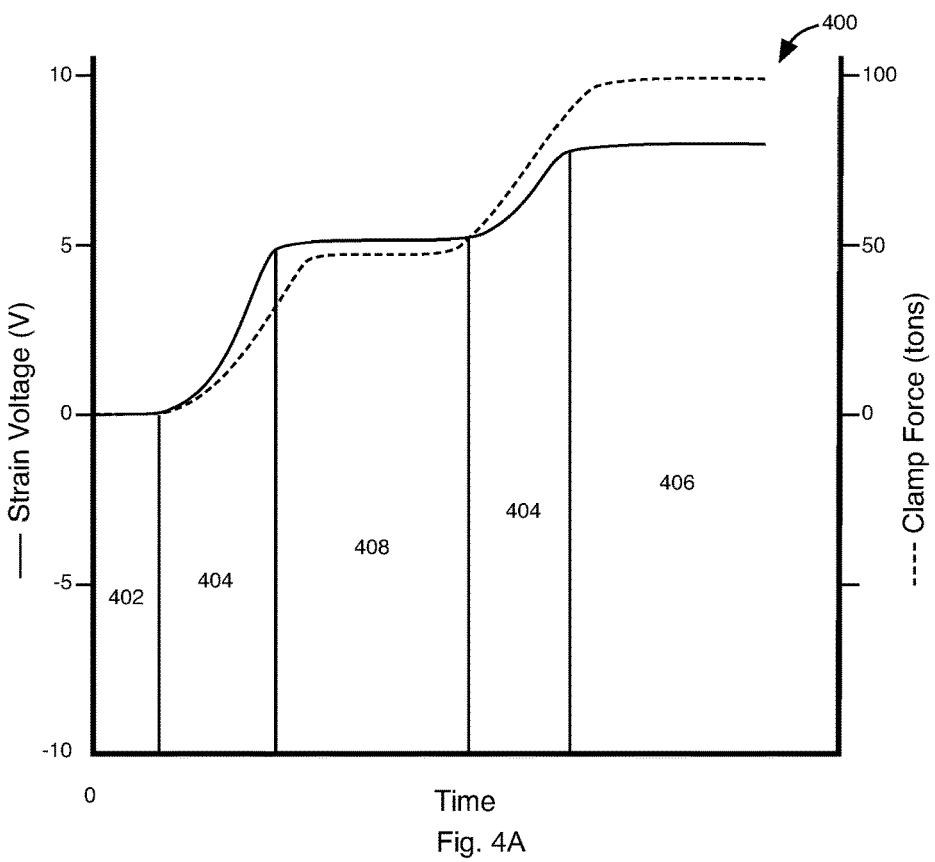
FIG. 4A is an exemplary target strain profile during clamp closing with an intermediate step.

FIG. 4A is an exemplary target strain profile during clamp closing with an intermediate step, otherwise known as "coining". During initial mold closing 402 there is no mold contact and no strain change. Once mold contact occurs 404, there is an increase in strain until intermediate clamp force setpoint is reached 408. A further increase in strain is experienced during injection 404 until final clamp force setpoint is reached 406.

Figure 5:
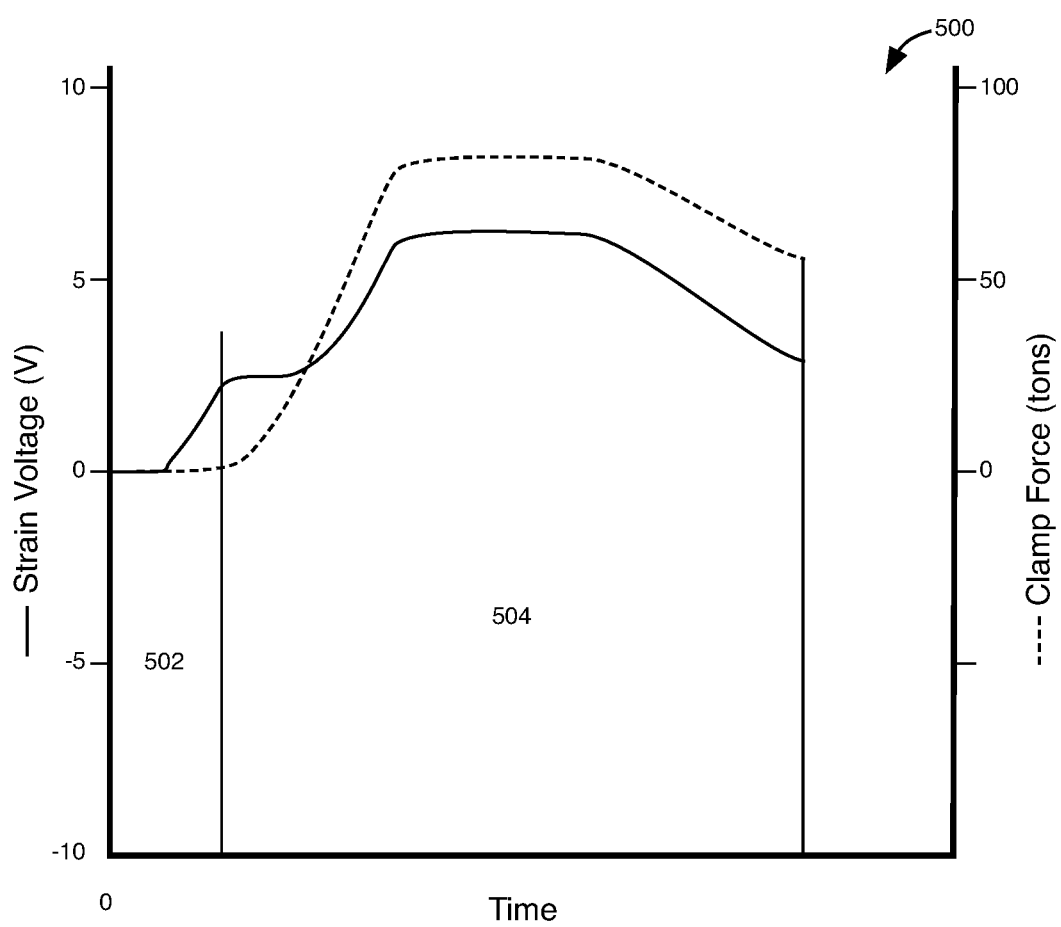
FIG. 5 is an exemplary target strain profile for clamping force during injection of plastic and filling of the mold.

FIG. 5 is an exemplary strain profile 500 for clamping force during injection of plastic. Once the mold has been closed 502 and plastic starts to fill the mold 504, the clamping force varies during fill based on the target strain profile.

Figure 6:
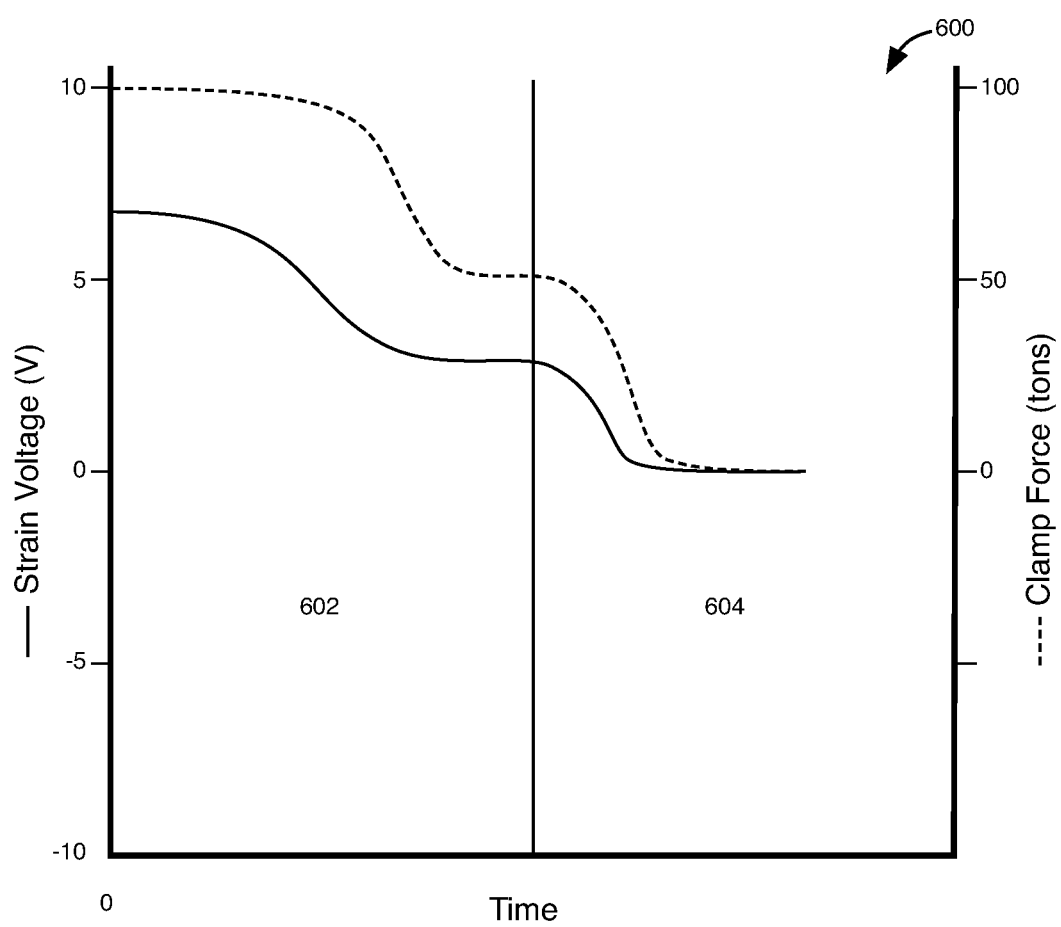
FIG. 6 is an exemplary target strain profile during clamp opening.

FIG. 6 is an exemplary strain profile 600 during clamp opening. Once the part has been cooling and starts to shrink away from the molding surfaces a decrease in strain will start to occur 602. Based on the target strain profile, the clamp will reduce force to zero 604 and start to open.

Figure 7:
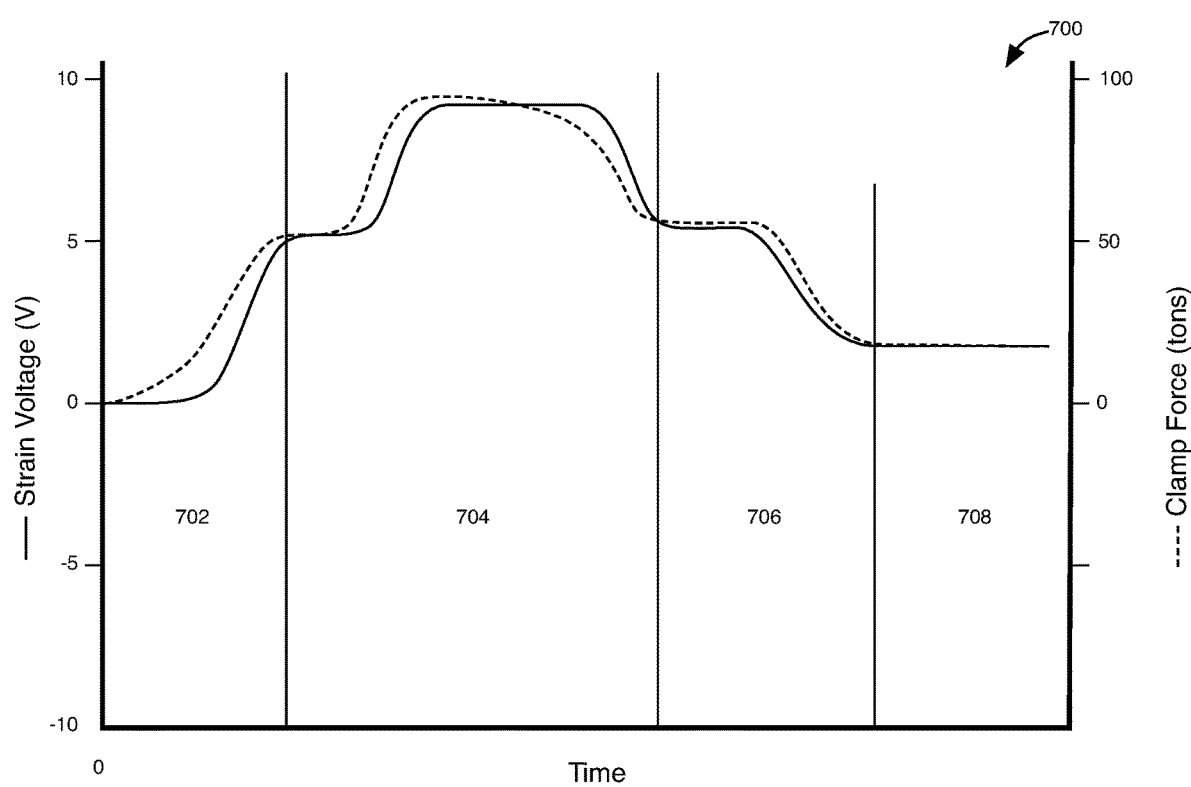
FIG. 7 is an exemplary target strain profile for clamping forces application throughout the entire molding process.

FIG. 7 is an exemplary strain profile 700 for clamping forces application throughout the entire molding process. The mold closes and starts to apply force 702 followed by the filling of the mold with plastic 704. As the part cools 706, the clamping force is decreased and the mold opens 708.

Figure 8:
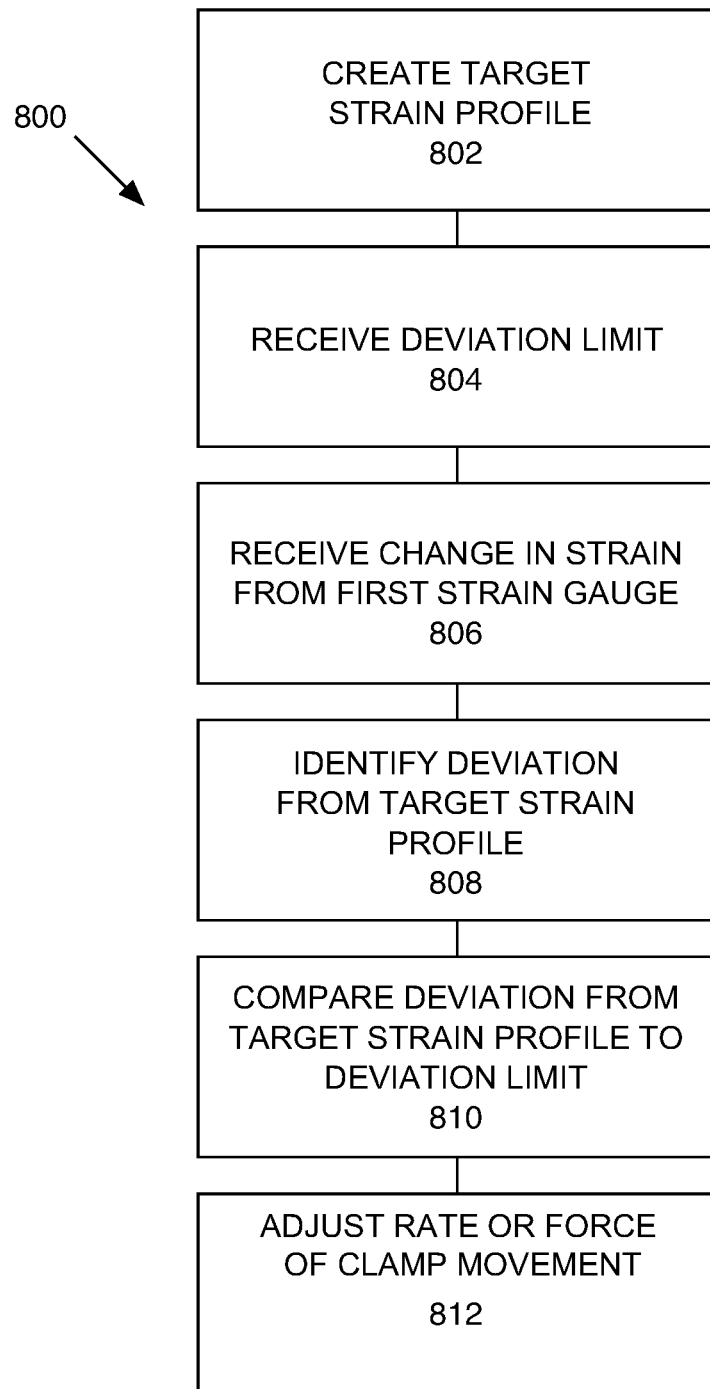
FIG. 8 is a flow diagram of an example method of monitoring and controlling a rate or a force of clamp movement.

FIG. 8 is a flow diagram of an example method 800 of monitoring and controlling a rate or a force of clamp movement. Box 802 illustrates creating, by one or more processors, a target strain profile for a clamping and unclamping process of a molding apparatus. Box 804 illustrates receiving, via an interface, an upper deviation limit and a lower deviation limit for the target strain profile. Box 806 illustrates receiving, as an output from a first strain gauge, a change in strain in a mold. Box 808 illustrates identifying, by the one or more processors, a deviation from the target strain profile based on the sensed change in strain provided as the output from the first strain gauge. Box 810 illustrates comparing, by the one or more processors, the deviation to the upper deviation limit or the lower deviation limit. Box 812 illustrates determining that the deviation exceeds the upper deviation limit or the lower deviation limit and adjusting a rate or a force of clamp movement.

Figure 9A:
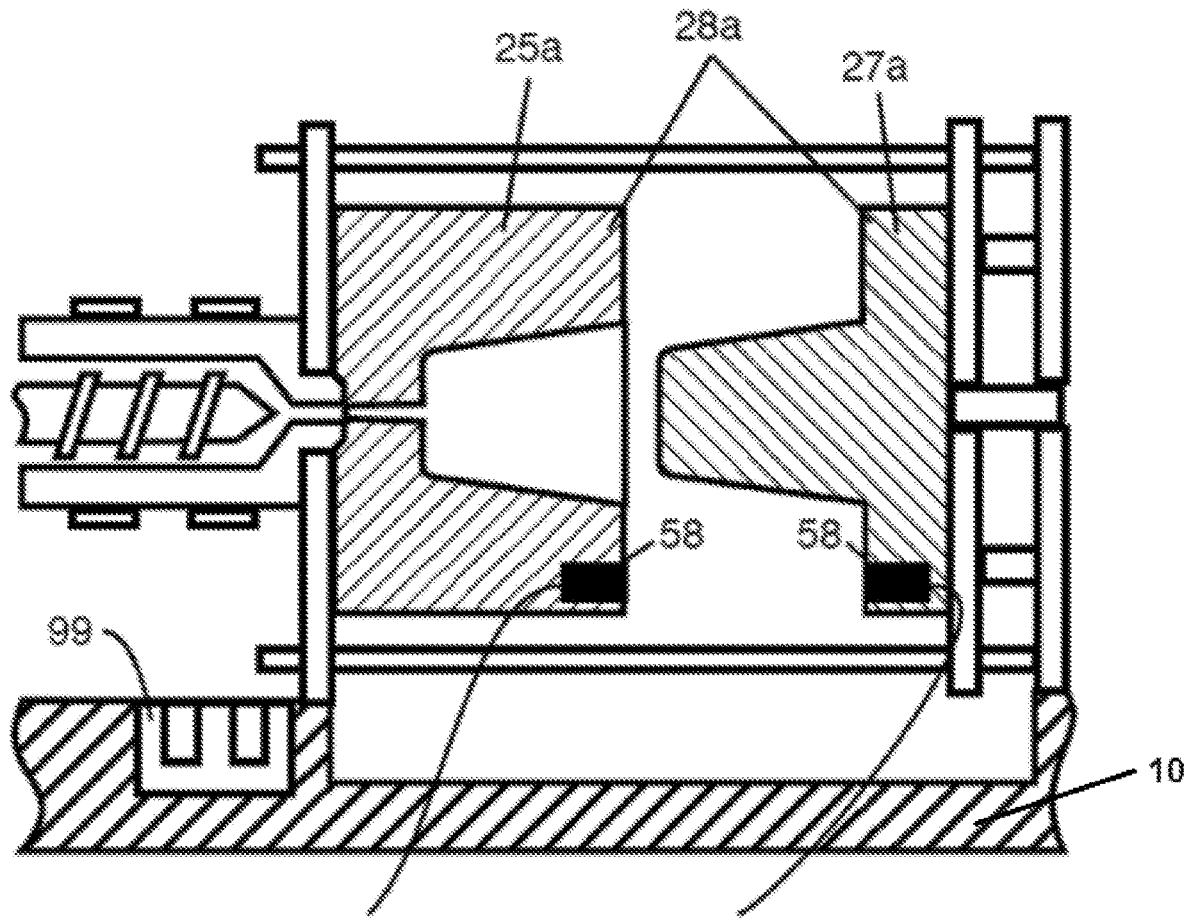
FIG. 9A illustrates a conventional injection molding apparatus having a first mold installed with portable strain gauges sensor assemblies provided on the first mold.
Figure 9B:
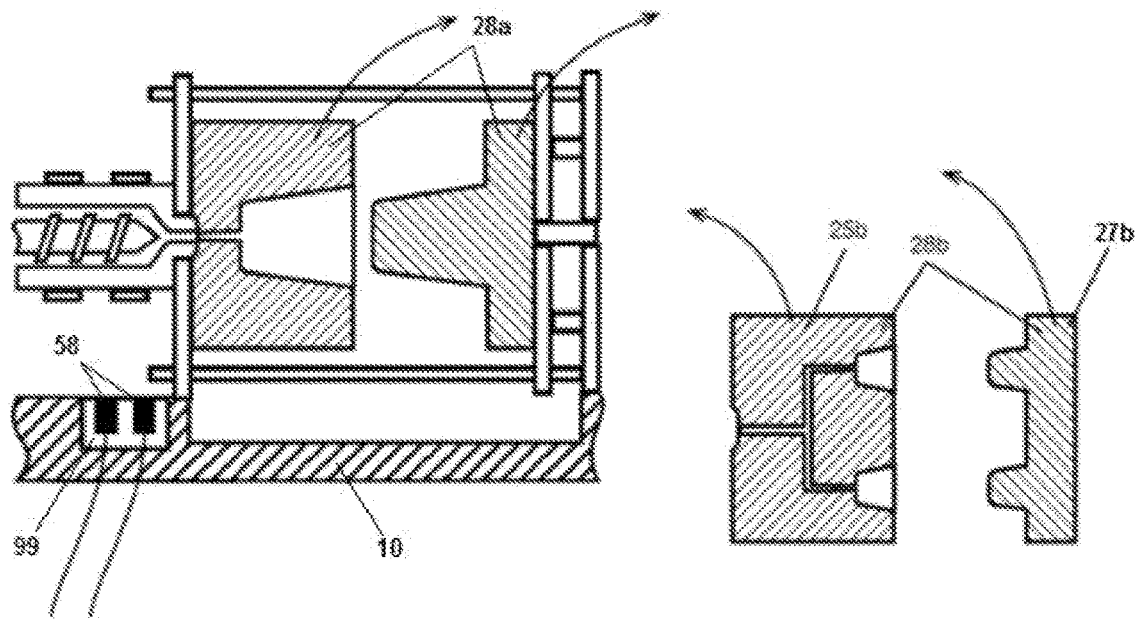
FIG. 9B illustrates the conventional injection molding apparatus of FIG. 9A where the portable strain gauge sensor assemblies have been removed from the first mold and stored in a strain gauge bracket provided on the molding apparatus.
Figure 9C:
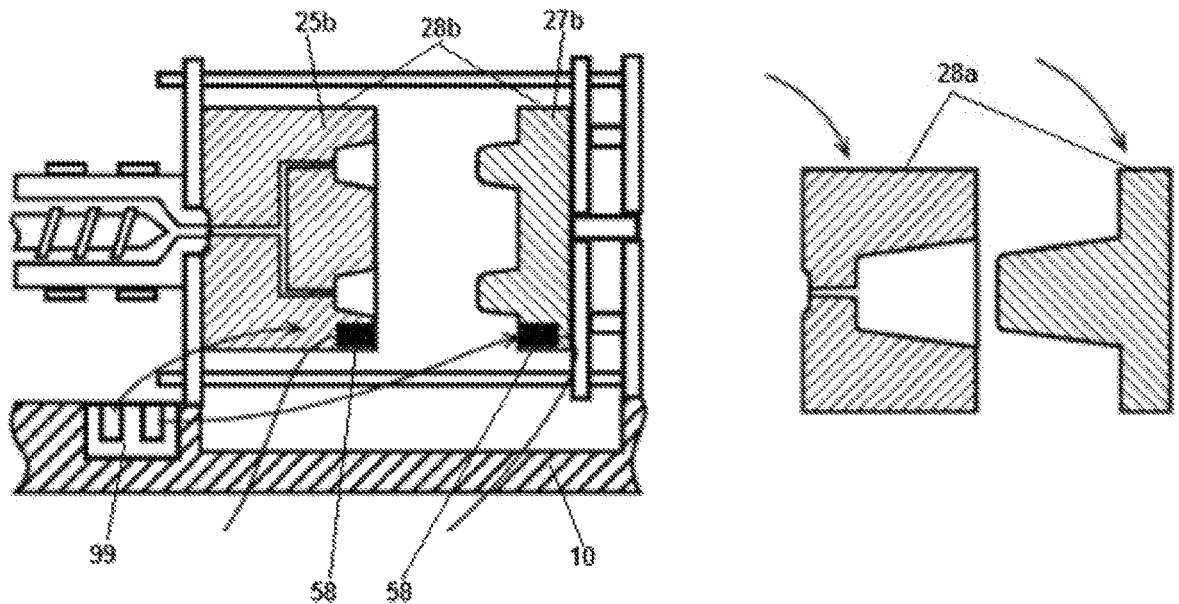
FIG. 9C illustrates the conventional injection molding apparatus of FIGS. 9A and 9B where the first mold has been removed, a second mold has been installed, and the portable strain gauge sensor assemblies have been removed from the strain gauge bracket and provided on the second mold.

FIGS. 9A-9C illustrate the use of strain gauge sensor assemblies 58 in different molds 28 interchangeable in the same injection molding apparatus 10. In FIG. 9A, a first mold 28a is used in injection molding apparatus 10. Strain gauge sensor assemblies 58 are provided on first and second mold sides 25a and 27a of the first mold 28a. As shown in FIG. 9B, the strain gauge sensor assemblies 58 are removed from the first mold 28a and placed in a strain gauge bracket 99 on the injection molding apparatus 10. First mold 28a is then removed from the injection molding apparatus 10 and a second mold 28b is installed. As shown in FIG. 9C, after installation of second mold 28b, the strain gauge sensor assemblies 58 are removed from the strain gauge bracket 99 and provided on first and second mold sides 25b and 27b of the second mold 28b. Although FIGS. 9A-9C depict the portability of strain gauge sensor assemblies 58 from a first mold 28a to a second mold 28b, the strain gauge sensor assemblies 58 could likewise be moved from a first location on a mold 28 to a second location on a mold 28. Further, a single strain gauge assembly 58 or more than two strain gauge assemblies 58 could be portable between various locations and molds 28.

While specific embodiments have been described herein, variations may be made to the described embodiments that are still considered within the scope of the appended claims.

What is claimed is:

1. A method of monitoring and controlling a molding clamping apparatus comprising:
    creating, by one or more processors, a target strain profile for a clamping and unclamping process of a molding apparatus;
    receiving, via an interface, an upper deviation limit and a lower deviation limit for the target strain profile;
    measuring and amplifying a change in strain experienced by a first mold side with a first portion of a strain gauge assembly, the first portion of the strain gauge assembly being secured to the first mold side and a second portion of the strain gauge assembly being secured to a second mold side, wherein the first portion of the strain gauge assembly is acted upon by the second portion of the strain gauge assembly when the first mold side and the second mold side are closed;

receiving, as an output from the first portion of the strain gauge assembly, the amplified change in strain;

receiving, as an output from a temperature sensor, temperature data taken from the first mold side on which the first portion of the strain gauge assembly is located;

identifying, by the one or more processors, a deviation from the target strain profile based on the amplified change in strain provided as the output from the first portion of the strain gauge assembly and the temperature data provided as the output from the temperature sensor;

comparing, by the one or more processors, the deviation to the upper deviation limit or the lower deviation limit;

determining, by the one or more processors, that the deviation exceeds the upper deviation limit or is less than the lower deviation limit and adjusting a rate or a force of clamp movement.

2. The method of monitoring and controlling a molding clamping apparatus of claim 1, wherein the first portion of the strain gauge assembly is configured to be portable between multiple locations on the outside surface of the molding apparatus or to a second molding apparatus or to a strain gauge bracket.

3. The method of monitoring and controlling a molding clamping apparatus of claim 1, and:

receiving, as an output from a supplemental strain gauge, a supplemental change in strain; and identifying, by the one or more processors, the deviation from the target strain profile based on the amplified change in strain provided as the output from the first portion of the strain gauge assembly and the supplemental sensed change in strain provided as the output from the supplemental strain gauge.

4. The method of monitoring and controlling a molding clamping apparatus of claim 1, wherein adjusting the rate or the force of clamp movement includes adjusting a flow of oil to at least one hydraulic valve.

5. The method of monitoring and controlling a molding clamping apparatus of claim 1, wherein adjusting the rate or the force of clamp movement includes adjusting an electric current or voltage to an electric motor.

6. The method of monitoring and controlling a molding clamping apparatus of claim 1, wherein the target strain profile has a first portion relating to a clamp closing process, a second portion relating to a filling process, and a third portion relating to a clamp opening process.

7. The method of monitoring and controlling a molding clamping apparatus of claim 6, wherein the first portion relating to the clamp closing process includes an intermediate portion relating to a coining process having an intermediate clamp force setpoint.

* * * * *